Sept. 19, 1939.  L. P. FISHER  2,173,795
TIRE SPREADER AND INSPECTION MACHINE
Filed Sept. 23, 1937
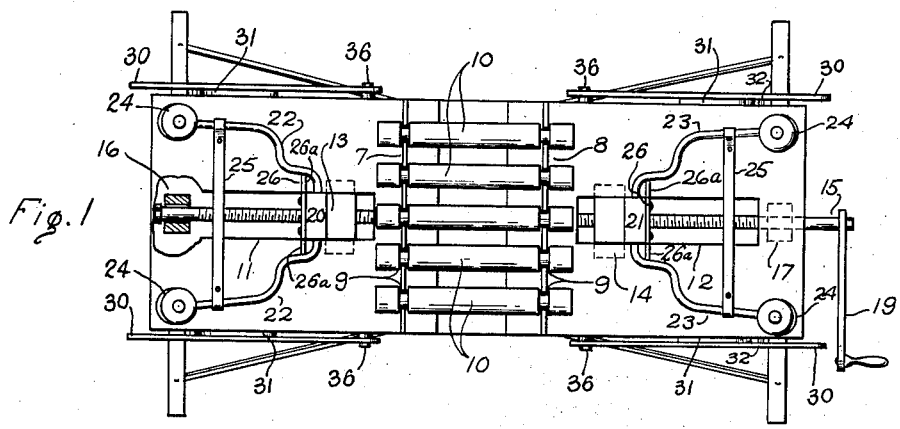
Fig. 1
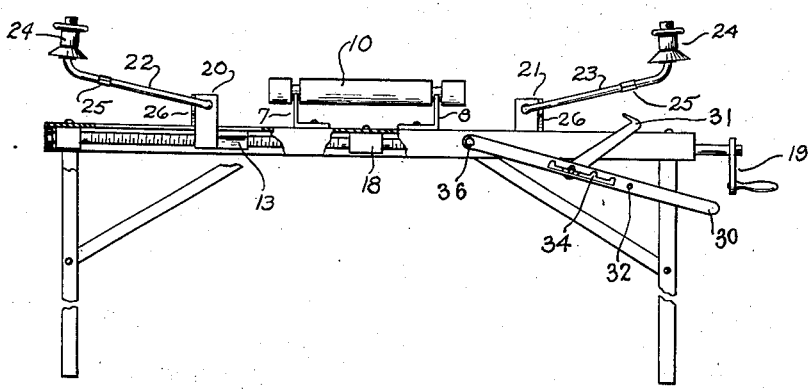
Fig. 2
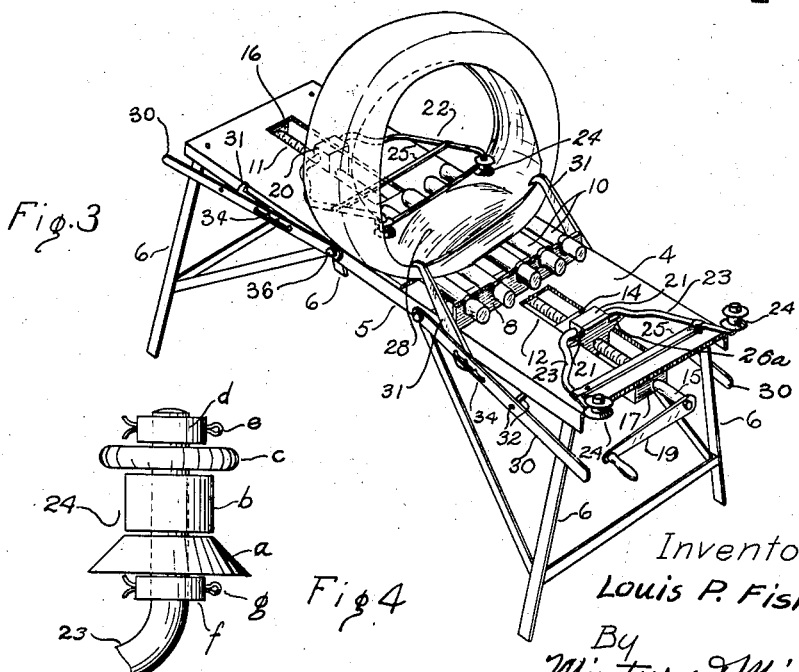
Fig. 3
Fig. 4
Inventor
Louis P. Fisher,
By
Minturn & Minturn
Attorneys Patented Sept. 19, 1939

2,173,795

UNITED STATES PATENT OFFICE 2,173,795

TIRE SPREADER AND INSPECTION MACHINE

Louis P. Fisher, Indianapolis, Ind., assignor to Bowes Seal Fast Corporation, Indianapolis, Ind., a corporation of Indiana Application September 23, 1937, Serial No. 165,377

6 Claims. (Cl. 154—9)

This invention relates to the inspection of automobile tires for holes and weak places caused by punctures and usage. Such inspection includes a careful examination of the inside surface of the tire which is rendered difficult by its almost cylindrical shape in cross section and the stiff and resistant nature of the material out of which the tire is made.

One object of this invention is to provide a machine by which the walls of the tire may be spread and held apart, presenting the inner surface in a sufficiently flattened condition for inspection over a considerable area.

A further object is so to mount the tire on rollers while thus spread that it can be rotated to bring all parts of the concave circular surface of the tire successively into view without having to change or release the spreading mechanism.

A still further object of the invention is to provide levers carrying hooks to replace spreading rollers and hold the spread tire with less obstruction to its visibility while under final examination and ultimate repair.

I accomplish the above and other minor objects which will hereinafter appear, by the mechanism illustrated in the accompanying drawing, in which:

Fig. 1 is a top plan view of my invention without a tire;

Fig. 2 is a side elevation of same; and

Fig. 3 is a perspective view of the machine with an automobile tire positioned thereon and spread for inspection, the view showing the spreader and rollers on one side of the tire replaced by lever carried hooks.

Fig. 4 is a spread-apart view in side elevation of the rollers on the cranked ends of the bails.

Like characters of reference indicate like parts in the several views of the drawing.

A horizontal table 4, preferably of metal, has depending marginal flanges 5 and is supported on legs 6. Bolted to the top of the table on opposite sides of its midlength are angle bars each having a vertical flange 7 and 8, respectively, and extending down from the upper edge of each flange are a series of notches 9 terminating in half round lower ends, here shown as five notches for each flange.

The notches 9 form seats for reduced diameters of a series of rollers 10, here shown as five in number. The reduction in diameter of the rollers is formed by circular channels, appropriately near each end of each roller, of a size and so spaced apart as to enter corresponding notches in the flanges 7 and 8. The rollers rotate freely in the notches and are readily assembled and removed individually.

Longitudinal centrally located slots 11 and 12 are formed through the table 4 between the rollers and ends of the table and blocks 13 and 14 are slidingly mounted in the respective slots. These blocks have oppositely threaded holes through which a shaft 15 is passed. The shaft 15 is journaled in end hangers 16 and 17 and a middle hanger 18, depending from the table. The screw threads of the shaft are in reverse to fit those of the blocks 13 and 14 whereby a rotation of shaft 15 moves the blocks in opposite directions. The shaft is rotated by a crank 19.

The block 13 has an upward extension 20 and the block 14 a like extension 21, in which the cross bar of generally U-shaped bails 22 and 23 are swingingly mounted. The end of each leg of each bail is cranked upwardly and form spindles for rollers 24 which are rotatively mounted thereon. The legs of each bail are connected by a tie bar 25.

The extensions 20 and 21 have plates 26 attached thereto with fingers 26a crossing the path of the legs of the bails to form stops for limiting the approach of the legs to the table and the legs are preferably bent as shown to reduce the lengths of the fingers.

In the operation of the machine as thus far described, a tire to be inspected is stood up crosswise of the rollers 10. The bails 22 and 23 are swung toward the tire and are moved by rotating crank 19 until all of the flanged rollers are hooked around the respective edges of the tire. Then the blocks are moved out by appropriately turning the crank 19, carrying the bails and rollers 24 with them and spreading the tire substantially to the condition shown in Fig. 3. The tire thus spread can be manually rotated by the person making the inspection, by reason of the rollers 10 on which the tire rests and of the rollers 24 contacting the edges of the spread tire.

Also, I have found the best results are obtained in spreading the tire when the attachments of the bails in the block extension 21 are in a plane close to that of the axes of rollers 10, as best seen in Fig. 2. That is because the pull by the rollers 24 is more outwardly than downwardly on the edges of the tire.

It will be noted in the purposely spread-apart view of a roller in Fig. 4 that the three members $a$, $b$, and $c$ comprising it are separate members instead of an integral unit. This separation is to prevent binding against the tire as the tire is revolved in the machine on rollers 10. In use the members a, b, and c, are held together closely between collars d and f, here shown as retained on bails 23 by cotter pins e and g.

When sufficiently spread the tire will bulge up as shown at 28 in Fig. 3, due to the tension and resiliency of the tire material, thus making it easier to examine and repair.

In order to remove the bails 22 and 23, bar 25 and rollers 24 out of the way of the operator after the tire is spread, I provide the four levers 30, pivoted at their inner ends by pivots 36 to the flange 5, two on each side of the machine, and to each of the levers I hinge a bar 31, terminating in a hook at the far end of the bar. This hook is adapted to engage and hold the edges of the spread-apart tire by raising the far end of its lever 30. Each lever 30 has a pin 32 projecting inwardly from its inner side and adapted to engage the under side of flange 5.

In the further operation of my machine after the hooks on the ends of bars 31 are engaged with the edges of the spread tire, the levers 30 are lowered thereby spreading the tire a little more and loosening the rollers 24. The pins on levers 30 are caught under flange 5 of the table to hold the levers 30 and spread the tire and then the bails carrying the loosened rollers 24 are swung away from the tire to the outer positions shown in the drawing.

It will be noted that hooks 31 on the levers 30 pull downwardly more than the bails carrying the rollers 24, which change in direction of the pull causes the tire to be flattened out more completely, at the edges of the tire, thus getting rid of the curves and coves and in fact reversing them more completely to aid inspection and repair, than is possible with the rollers 24 alone.

An adjustment of the hook bars 31 on their levers 30 is desirable because of a variation in the tire sizes. This is accomplished by forming a series of holes in bar 30 for the pivotal attachment of the hook bar at different distances from the fulcrum of lever 30. Four holes are shown, connected by slot 34 to enable the pin to be slid from one hole to another.

Having thus fully described my invention, what I claim as new and wish to secure by Letters Patent of the United States is:

1. In a machine for inspecting and repairing automobile tires, a table, a plurality of cylindrical rollers supported upon the table, a shaft carried by the table parallel with the rollers having right and left threads, a sliding block on each side of the rollers supported by the table and screwing on the right and left threads respectively of the shaft, U-shaped bails swingingly supported from the blocks, and a flanged roller on the end of each leg of the bails.

2. In a machine for inspecting and repairing automobile tires, a table, a plurality of cylindrical rollers supported upon the table, a shaft carried by the table parallel with the rollers having right and left threads, a sliding block on each side of the rollers supported by the table and screwing on the right and left threads respectively of the shaft, U-shaped bails swingingly supported from the blocks, and a flanged roller on the end of each leg of the bails, a pair of levers pivotally attached at their inner ends to each side of the table and a hook-bar pivoted to each lever, and means to lock the levers in lowered positions.

3. In a machine for inspecting and repairing automobile tires, a table, a plurality of cylindrical rollers supported upon the table with their axes of rotation in a horizontal plane, a sliding block on each side of the rollers supported from the table, U-shaped bails swingingly supported from the blocks in a plane close to that of the axes of the rollers, and a flanged roller on the end of each leg of the bails.

4. In combination, a table, a plurality of closely-spaced cylindrical rollers supported by the table upon which a tire to be spread is placed, a pair of movable members also supported by the table movable toward and from a tire when the tire is on the rollers, a pair of spread apart rollers mounted on each of the movable members, said last rollers having flanges at each end, each pair of said second rollers engaging opposite edges of a tire to be spread apart and bulged, and means for moving the movable members in opposite directions.

5. In combination, a table, a plurality of closely-spaced cylindrical rollers supported by the table upon which a tire to be spread is placed, a pair of movable members also supported by the table movable toward and from a tire when the tire is on the rollers, a pair of spread apart rollers mounted on each of the movable members, said last rollers having flanges on each end, each pair of said second rollers engaging opposite edges of a tire to be spread apart and bulged, means for moving the movable members in opposite directions to spread the tire, and hook means movably connected with the table for holding the tire as spread by the last rollers in spread condition after the spread tire is released by the spreading rollers and for further spreading it to a reversed curvature.

6. In combination, a table, a plurality of closely-spaced cylindrical rollers supported by the table upon which a tire to be spread is placed, a pair of movable members also supported by the table movable toward and from a tire when the tire is on the rollers, a pair of spread apart rollers mounted on each of the movable members, said last rollers having flanges at each end, each pair of said second rollers engaging opposite edges of a tire to be spread apart and bulged, means for moving the movable members in opposite directions to spread the tire, and hook means for holding the tire as spread by the last rollers in spread condition after the spread tire is released by the spreading rollers, comprising levers carried by the table having hooks to engage the edges of the spread tire and spread it further to reversed curvature, and means to lock the levers.

LOUIS P. FISHER.